(12) United States Patent
Lee et al.

(10) Patent No.: US 10,484,585 B2
(45) Date of Patent: Nov. 19, 2019

(54) IMAGE SENSING APPARATUS, IMAGE SENSING METHOD, DISTANCE MEASURING APPARATUS, AND DISTANCE MEASURING METHOD

(71) Applicant: GWANGJU INSTITUTE OF SCIENCE AND TECHNOLOGY, Gwangju (KR)

(72) Inventors: Heung No Lee, Gwangju (KR); Woong Bi Lee, Gwangju (KR); Cheol Sun Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 63 days.

(21) Appl. No.: 15/669,554

(22) Filed: Aug. 4, 2017

(65) Prior Publication Data
US 2018/0041673 A1   Feb. 8, 2018

(30) Foreign Application Priority Data
Aug. 4, 2016 (KR) .................. 10-2016-0099298

(51) Int. Cl.
*H04N 5/225* (2006.01)
*G02B 3/00* (2006.01)
*H04N 5/232* (2006.01)
*G02B 27/00* (2006.01)

(52) U.S. Cl.
CPC ............. *H04N 5/2254* (2013.01); *G02B 3/00* (2013.01); *G02B 3/0006* (2013.01); *G02B 27/0075* (2013.01); *H04N 5/23229* (2013.01); *H04N 5/23293* (2013.01)

(58) Field of Classification Search
None
See application file for complete search history.

(56) References Cited

U.S. PATENT DOCUMENTS 10,222,458 B2 *  3/2019  Pacala ................... G01S 7/4816
2012/0285024 A1 * 11/2012  Miller .................... G01C 11/04
                                                                33/1 A (Continued)

FOREIGN PATENT DOCUMENTS

JP   2010096723 A    4/2010
KR   10-1638022      7/2016

*Primary Examiner* — Cynthia Segura
(74) *Attorney, Agent, or Firm* — Steven M. Greenberg, Esq.; Shutts & Brown LLP

(57) ABSTRACT

There is provided an image sensing apparatus according to the present invention including: an image recovery portion which recovers an image from a sensed image by using a digital signal processing technique which uses a sparse representation for each measurement matrix; and a distance measurement portion which measures a distance of an object by using a norm of a value using at least light amount information of the estimated pixel which is estimated for each measurement matrix, in which the image recovery portion recovers the image by using the measurement matrix corresponding to the distance measured by the distance measurement portion. According to the present invention, when an image is sensed using compound eyes, image sensing can be performed without a separate distance measuring device or the like.

16 Claims, 20 Drawing Sheets

(56) References Cited

U.S. PATENT DOCUMENTS

| | | | |
|---|---|---|---|
| 2014/0204385 A1* | 7/2014 | Ouyang | G01N 21/47 356/445 |
| 2014/0240532 A1* | 8/2014 | Marwah | H04N 5/2621 348/222.1 |
| 2016/0049765 A1* | 2/2016 | Eldada | G01S 17/89 356/5.01 |
| 2016/0203382 A1* | 7/2016 | Gardiner | G06K 9/4633 382/190 |
| 2016/0313118 A1* | 10/2016 | Hsu | G01C 3/08 |
| 2018/0267213 A1* | 9/2018 | Lee | G01J 1/0411 |
| 2018/0276793 A1* | 9/2018 | Kwon | G06T 17/00 |
| 2019/0018111 A1* | 1/2019 | Pacala | G01S 7/4816 |

* cited by examiner

IMAGE SENSING APPARATUS, IMAGE SENSING METHOD, DISTANCE MEASURING APPARATUS, AND DISTANCE MEASURING METHOD

CROSS-REFERENCE TO RELATED APPLICATIONS

This application claims priority under 35 U.S.C. § 119(a) to Korean Patent Application Serial Number 10-2016-0099298, filed Aug. 4, 2016, entitled "IMAGE SENSING APPARATUS, IMAGE SENSING METHOD, DISTANCE MEASURING APPARATUS, AND DISTANCE MEASURING METHOD," the entirety of which is incorporated herein by reference.

BACKGROUND OF THE INVENTION

Field of the Invention

The present invention relates to an image sensing apparatus, an image sensing method, a distance measuring apparatus, and a distance measuring method, and more particularly, to an image sensing apparatus, an image sensing method, a distance measuring apparatus, and a distance measuring method, which use a plurality of lenses.

Description of the Related Art

Compound eyes are representatively described as insect eyes, as an example and the compound eyes are provided by a plurality of simple eyes being arranged on a three-dimensional curved surface.

The compound eyes are characterized by a wide field of view (FOV), infinite depth, fast motion, and the like. Therefore, the compound eyes serve as a factor for increasing survival chances of insects from enemies. Due to these characteristics, the compound eyes are expected to be applied to surveillance cameras of micro aviation equipment, high-speed motion detection, image guided surgery, surgical equipment, or the like.

For several advantages of the compound eyes, an electronic eye, which is introduced on page 64 of The Science and Technology in July 2013, which is monthly published from The Korean Federation of Science and Technology Societies, can be referred. According to the introducing document described above, a method for producing artificial compound eyes based on the insect eyes is introduced. According to the document, the insect eyes can be produced. However, there is no mention as to a manner to process light which is incident through each simple eye provided to the compound eyes and although the manner is unclear in contents of the document, when being best understood, for example, an amount of light which is incident through each simple eye corresponds to any one pixel in the entire image.

According to the document, since light which is incident through each simple eye is recognized as a single pixel and thus the image is processed, an image having a high resolution cannot be obtained unless the number of lens corresponding to each simple eye is increased. In addition, it is natural that it is difficult to increase the number of lens indefinitely in a narrow space in order to increase resolution of an image.

Due to such a problem, the applicant of the present invention has invented an image sensing apparatus using a plurality of lenses, as described in Korean Patent Application No. 10-2015-0132810. According to the Korean Patent Application, a method of recovering a more accurate image is introduced by using a compression sensing technique after a large amount of information is accepted through each simple eye.

However, the invention in the Korean Patent Application assumes that image is positioned at a specific distance from the image sensing apparatus and there is a problem that when the distance between an object and the image sensing apparatus is unknown, since measurement matrix corresponding to each distance cannot be specified, the image cannot be recovered.

BRIEF SUMMARY OF THE INVENTION

The present invention is proposed under the background described above and proposes an image sensing apparatus and a distance measuring apparatus which can recover an image even in a case where distance thereof is unknown.

According to the present invention, there is provided an image sensing apparatus including: compound eyes which can obtain a sensed image of an object by a plurality of simple eyes; a memory in which at least two measurement matrices in which obtained distances are different from each other are stored; an image recovery portion which recovers an image from the sensed image by using a digital signal processing technique which uses a sparse representation for each measurement matrix, using the at least two measurement matrices; and a distance measurement portion which measures a distance of the object by using a norm of a value using at least light amount information of the estimated pixel which is estimated for each measurement matrix, in which the image recovery portion recovers the image by using the measurement matrix corresponding to the distance measured by the distance measurement portion.

The image recovery portion may include an estimated sparsifying coefficient extraction portion which extracts an estimated sparsifying coefficient for each measurement matrix by using the digital signal processing technique; a light amount information extraction portion of the estimated pixel which extracts the light amount information of the estimated pixel from the estimated sparsifying coefficient which is extracted by the estimated sparsifying coefficient extraction portion; and an image selection portion which selects an image recovered as the measurement matrix corresponding to the distance measured by the distance measurement portion. In addition, the image recovery portion may increase an accuracy of calculation by using a single set of measurement matrices in which the respective measurement matrices are collected at a time.

The distance measurement portion may measure a distance of the object by comparing at least two residual norms provided for each measurement matrix.

The distance measurement portion may measure the distance of the object by comparing a recovery signals having a high energy. When the energy of the recovery signal is compared, the energy of the recovery signal may be normalized and compared.

The digital signal processing technique using the sparse representation may apply any one of an alternative direction method, a simplex method, a slope descent method, a second order differentiation method, and an L1 norm optimization method.

According to the present invention, there is provided a distance measuring apparatus including: compound eyes which can obtain a sensed image of an object by a plurality of simple eyes; a memory in which at least two measurement matrices in which obtained distances are different from each other are stored; a light amount information extraction portion of an estimated pixel which can extract light amount information of the estimated pixel from the sensed image by using a digital signal processing technique which uses a sparse representation for each measurement matrix using the at least two measurement matrices; and a distance measurement portion which measures a distance of the object by using a norm of a value using at least light amount information of the estimated pixel which is estimated for each measurement matrix.

The distance measurement portion may measure a distance of the object by comparing the residual norms for each measurement matrix.

The distance measurement portion may measure the distance of the object by comparing the energy of the recovery signal.

According to the present invention, there is provided a distance measuring method including: obtaining an estimated sparsifying coefficient from a sensed image of an object obtained by compound eyes by using at least two measurement matrices in which obtained distances are different from each other; extracting light amount information of an estimated pixel by using the estimated sparsifying coefficient; and measuring a distance of the object using a norm of a value using at least the light amount information of the estimated pixel which is estimated for each measurement matrix.

The measuring a distance may be performed by comparing residual norms.

The measuring a distance may be performed by comparing the energy of the recovery signal.

The distances of at least two objects of which distances are different from each other may be measured together.

An image of the object may be recovered from the sensed image by using a measurement matrix determined by the distance measurement method.

According to the present invention, an image sensing apparatus is proposed which can recover a more accurate image even in a case where the distance between the image sensing apparatus and an object is unknown. In addition, the distance from the position of the image sensing apparatus to a position of the object can be obtained through recovery of the image with respect to the information obtained from the compound eyes.

Therefore, effects of an accurate image acquisition and acquisition of distance information can be obtained while many advantages of the compound eyes are used.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Hereinafter, specific embodiments of the present invention will be described in detail with reference to the drawings. However, idea of the present invention is not limited to embodiments to be described below, those skilled in the art which understands the idea of the invention can easily propose alternative embodiments that fall within the scope of the same idea by addition, change, deletion, supplement of components, or the like, and the alternative embodiments are also included within the scope of the present invention.

In addition, since the attached drawings are mainly for the purpose of understanding the idea of the present invention, there may be difference in size, orientation, form, and the like between the attached drawings and actual implementation.

In addition, with respect to the mathematical processing and algorithm which are necessary for understanding the present invention and are already well known to those skilled in the art, a portion introducing the technique thereof is presented, the entire contents thereof are included in the specification of the present invention, and the detailed description thereof will be omitted.

Figure 1:
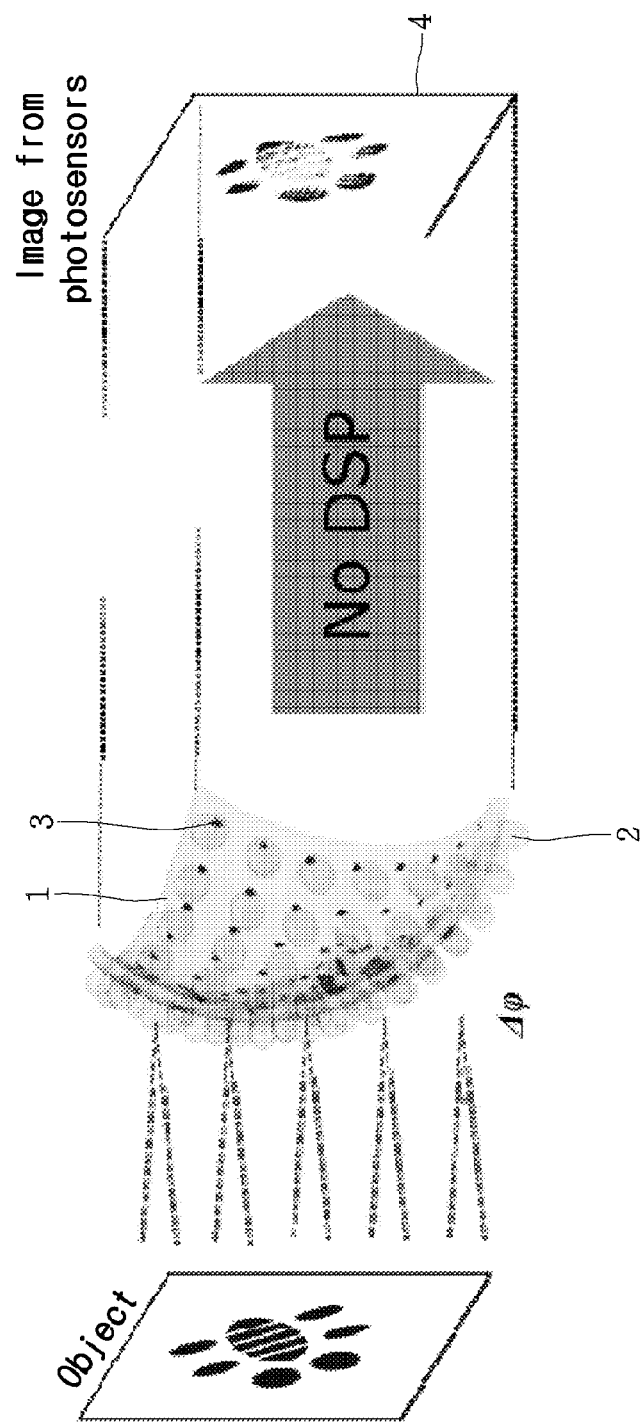
FIG. 1 and FIG. 2 are diagrams explaining a simple configuration of an image sensing apparatus using a plurality of lenses by comparing the related art and an embodiment of the present invention, respectively.
Figure 2:
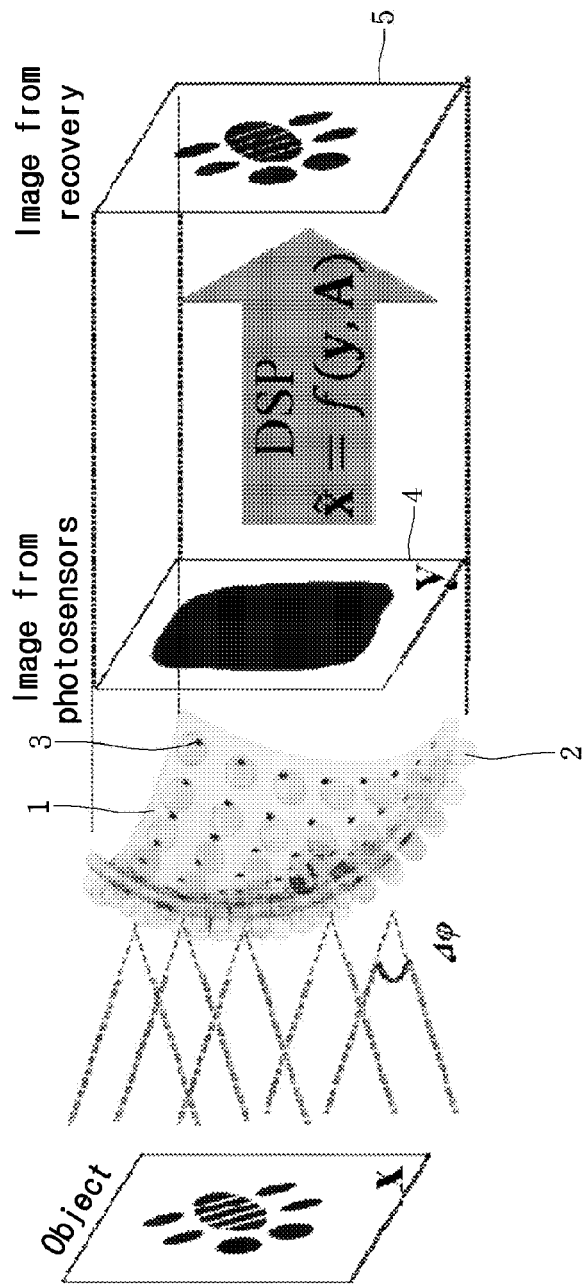

FIG. 1 and FIG. 2 explain the brief operation of an image sensing apparatus using a plurality of lenses in comparison with a case of using no compression sensing (FIG. 1) and a case of using the compression sensing (FIG. 2).

A case of using no compression sensing will be explained with reference to FIG. 1. First, an image of an object is incident through a plurality of lenses 2 supported on a curved surface 1. Each lens included in the plurality of lenses 2 faces a specific region in a three-dimensional space. Hereinafter, the specific region is referred to as a viewing region corresponding to each lens. In a case where there is an object in the viewing region, lenses corresponding to an object placed in the viewing region can accept a form of change in light amount. A single photo sensor 3 may correspond to each of the plurality of lenses 2. The photo sensor 3 can recognize the light amount. The photo sensor 3 can recognize the light amount but may not recognize the distribution of the light amount in two dimensions using any one photo sensor. The photo sensor 3 provides a sensed image 4 corresponding to a single pixel on an image. The curved surface 1 may be provided as a one-dimensional curved surface, a two-dimensional curved surface, or a three-dimensional curved surface.

The sensed image 4 can provide pixels corresponding to the number of lens 2. Therefore, in a case where the number of lenses 2 is large, a sensed image 4 having a high resolution can be obtained and in a case where the number of lenses 2 is small, only a sensed image 4 having a low resolution can be obtained. However, it is difficult to increase the number of lenses 2 infinitely, and one reason thereof is that because it is difficult to dispose microelectronic elements and micro optical elements, the lens 2 which is especially important to have a smooth outside surface on the curved surface.

A case of using the compression sensing will be described with reference to FIG. 2. In the image sensing apparatus, the photo sensor 3 recognizes a form of light amount through the lens 2 disposed on the curved surface 1. Furthermore, an acceptance angle of the lens 2 is considerably greater than an angle between the lenses 2. Therefore, since a substantial amount of the sensed image 4 sensed through each photo sensor 3 is overlapped for each pixel, an actually human-recognizable level of an image cannot be obtained. However, the sensed image 4 can obtain a recovered image 5 through digital signal processing (DSP) and the recovered image 5 can obtain a superior level of resolution as compared with the sensed image 4 obtained in a case where the compression sensing technique is not used.

As illustrated in FIG. 2, in a case where the compression sensing is used, more information is accepted and more accurate image information can be obtained through digital signal processing.

Figure 3:
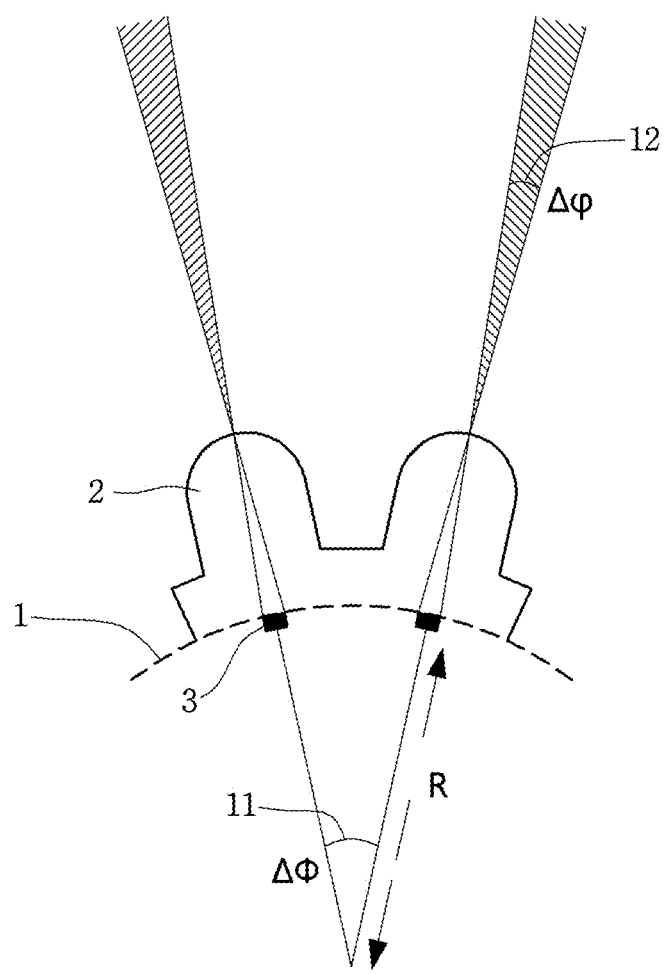
FIG. 3 and FIG. 4 are diagrams comparing and explaining an acceptance angle and an angle between the lenses in the image sensing apparatus.
Figure 4:
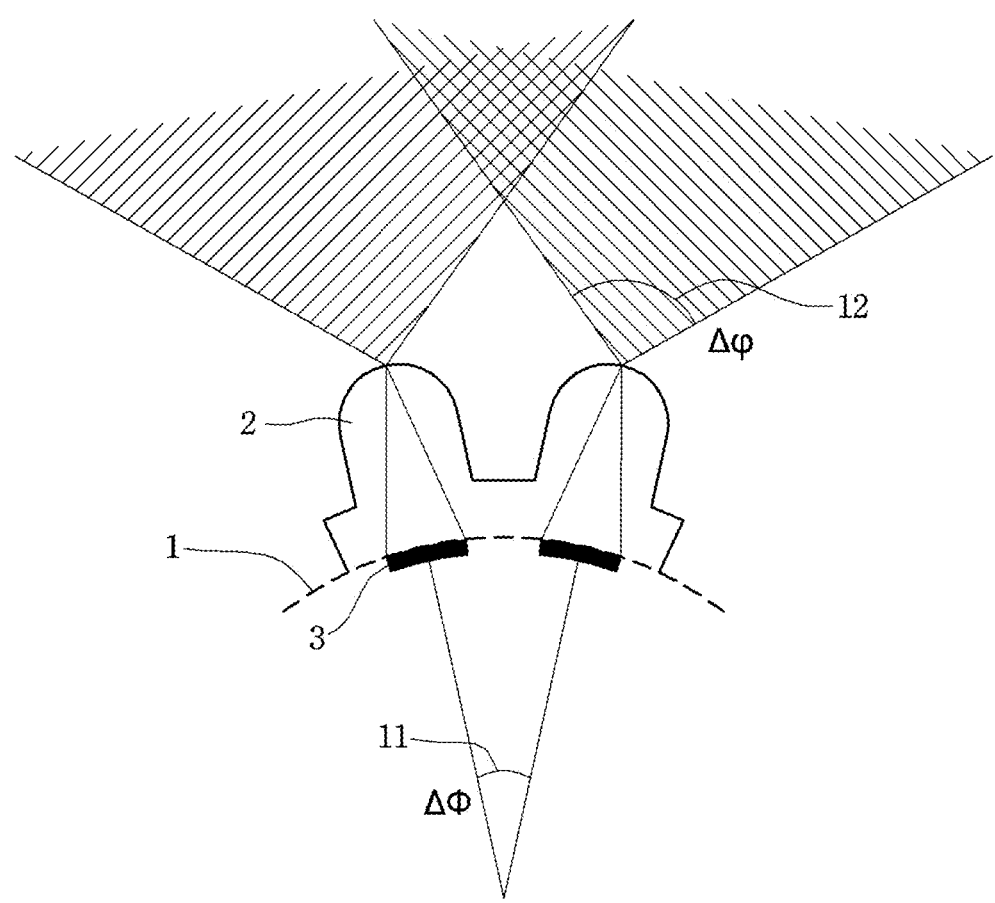

FIG. 3 and FIG. 4 are diagrams comparing and explaining the acceptance angle and the angle between the lenses in the image sensing apparatus.

FIG. 3 illustrates a comparative example and, with reference to FIG. 3, when the angle 11 between the lenses 2 is $\Delta\Phi$ and the acceptance angle 12 of the lens 2 is $\Delta\varphi$, since a relationship of $\Delta\Phi \geq \Delta\varphi$ is established, the angle 11 between lenses is equal to or greater than the acceptance angle 12 of the lens. In other words, viewing region information which is input through any one of the lenses 2 and viewing region information which is input through the other lens 2 does not overlap or the overlap between thereof is minimized. This is because the information of the viewing region which is incident through the lenses 2 which are different from each other is not desirable since an operation to increase noise interference in the sensed images 4 is performed. Of course, in the general natural world, there are cases where the relationship described above is different depending on the habitat environments of animals and insects. For example, in the case of a calliphora, there are also cases where the acceptance angle of the simple eye is 1.5 degrees and the angle between the simple eyes is 1.02 degrees.

FIG. 4 illustrates an embodiment and, with reference to FIG. 4, when the angle 11 between the lenses 2 is $\Delta\Phi$ and the acceptance angle 12 of the lens 2 is $\Delta\varphi$, since a relationship of $\Delta\Phi \Delta\varphi$ is established, the angle $\Delta\Phi$ between lenses is much smaller than the acceptance angle $\Delta\varphi$ of the lens, unlike FIG. 3. In other words, the information of viewing region which is input through any one of the lenses 2 much overlaps the information of the viewing region which is input through the other lens 2. For example, the information of the viewing region can be incident through dozens of lenses 2 together at any one point, although depending on the distance between the lens and the object. This is because although the information of the viewing region which is incident through the lenses 2 which are different from each other performs the operation to increase the interference in the sensed image 4, an operation that can find out more accurately a point at a specific spot can be performed by analyzing the information. The analysis can be performed since it can be known that a point at specific spots in a specific distance is incident through which lens by the measurement matrix.

Figure 5:
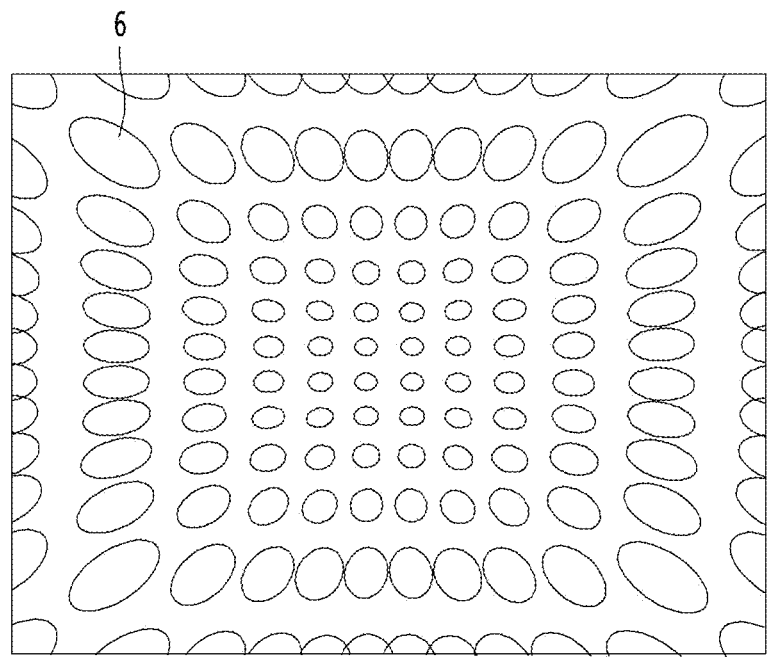
FIG. 5 and FIG. 6 are diagrams comparing and explaining viewing regions in the image sensing apparatus.
Figure 6:
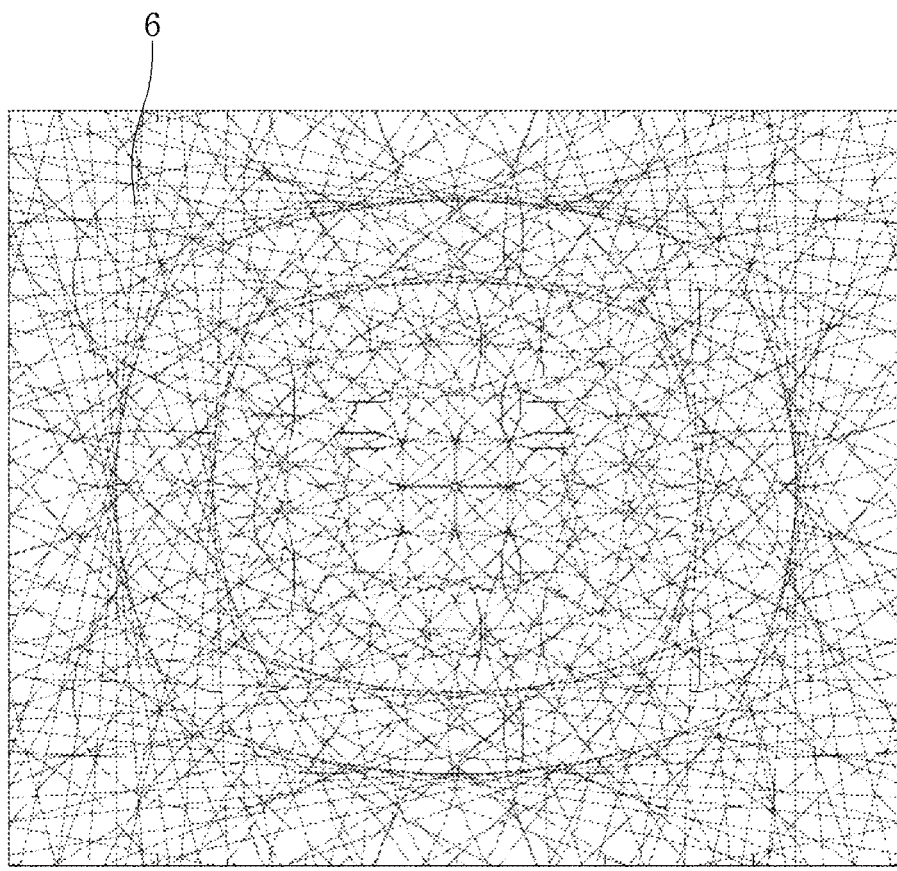

FIG. 5 and FIG. 6 are diagrams comparing and explaining the viewing regions in the image sensing apparatus. It is already described that the viewing region represents a two-dimensional region in which information of the viewing region is incident through any one lens 2.

With reference to FIG. 5, it can be seen that the viewing regions 6 corresponding to any one lens are arranged to become narrower in the middle portion on the arrangement of the plurality of lenses 2 and to become wider as the viewing region goes outward. This is because the arrangement of the lenses is of the same shape as that of the viewing regions and the viewing region is arranged two-dimensionally while a point which faces by the lens is arranged three-dimensionally.

With reference to FIG. 6, it can be seen that the size of any one of the viewing regions 6 is considerably greater than that in FIG. 5 when compared. Therefore, the specific spot can be included at the same time in the viewing regions 6 corresponding to dozens of lenses 2 at a maximum.

Figure 7:
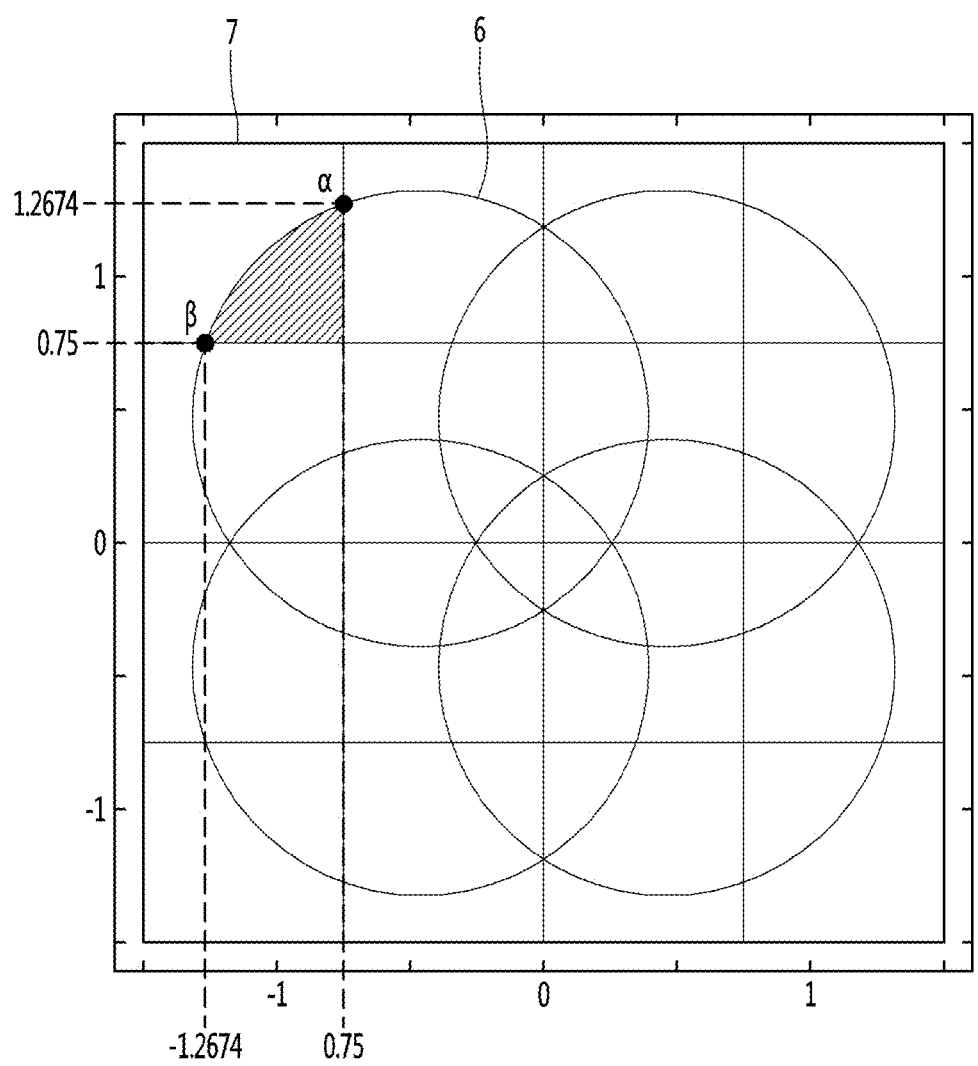
FIG. 7 is a diagram explaining a relationship between the viewing region and a pixel.

FIG. 7 is a diagram explaining a relationship between the viewing region and the pixel.

With reference to FIG. 7, the viewing region 6 of any one lens 2 is illustrated as a circular shape and each pixel 7 is illustrated as a square shape. Since four pixels 7 in the center are all included in the four viewing regions 6, information from the four lenses can be obtained. On the other hand, since the pixel at the outermost corner corresponds to only one viewing region 6, information can be obtained from only one lens. Here, the pixel may be a pixel of the sensed image 4.

An interrelationship between the viewing region and the pixel provided in FIG. 7 illustrates when the viewing region has a circular shape and actually since the viewing regions have various aspects and shapes according to the disposition and the number of lens, the viewing region, and the pixel may have more complex interrelationships.

Figure 8:
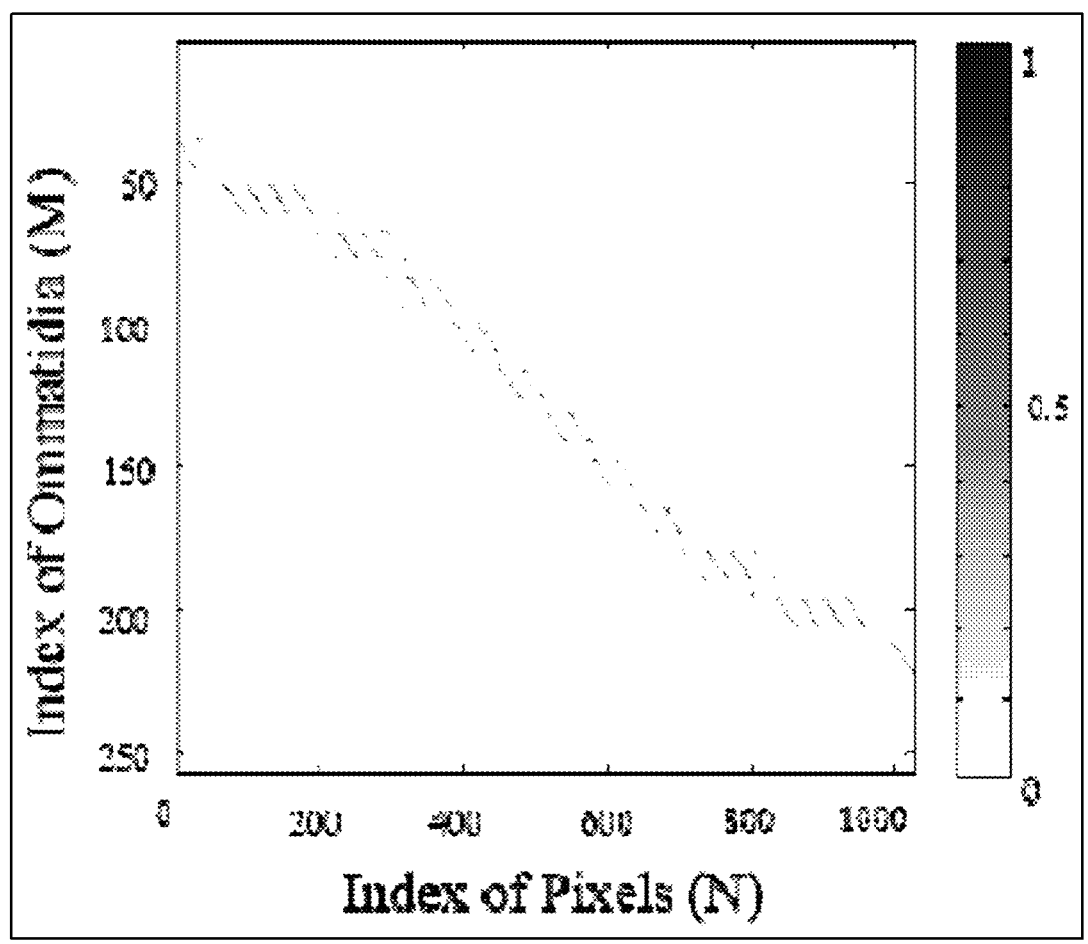
FIG. 8 and FIG. 9 are diagrams comparing and explaining measurement matrices obtained by the image sensing apparatus.
Figure 9:
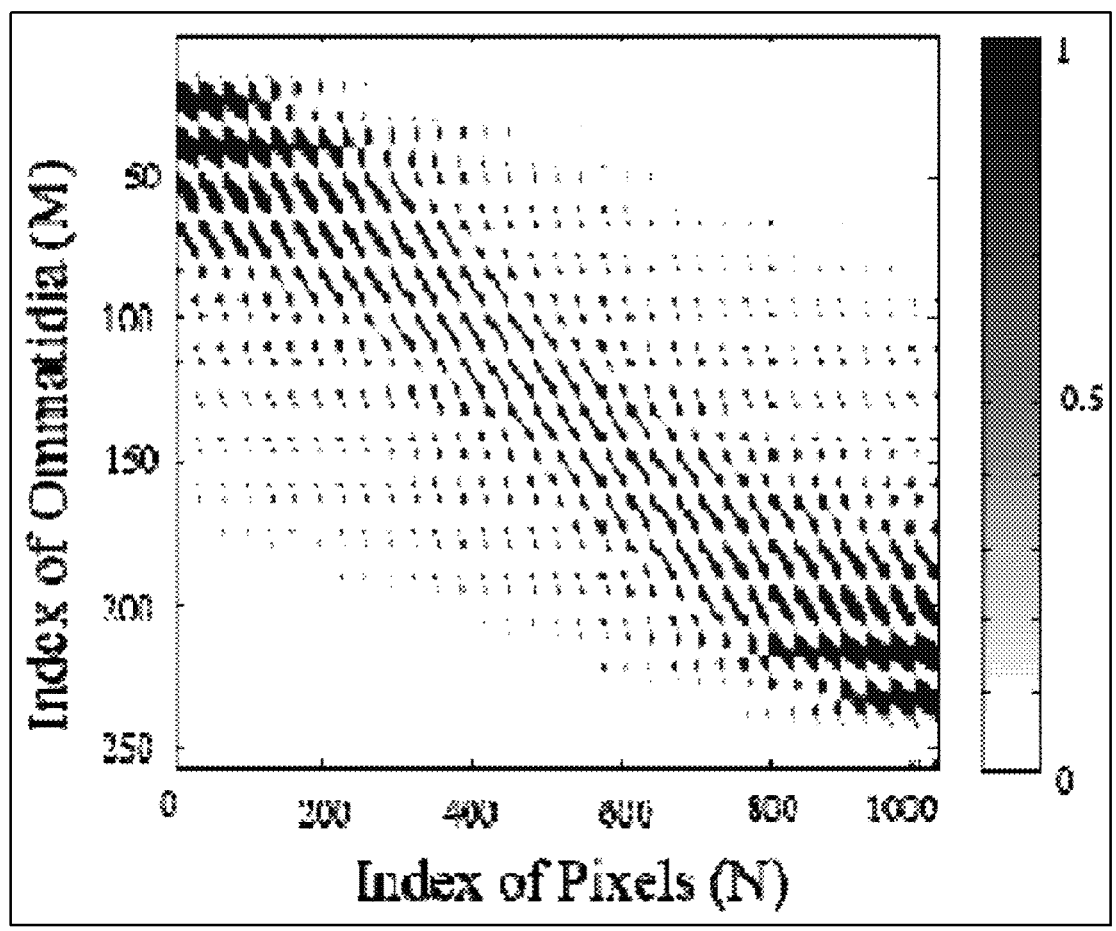

FIG. 8 and FIG. 9 are diagrams comparing and explaining the measurement matrix obtained in the image sensing apparatus. Here, the measurement matrix may have the same distance between the lens and the object and may be obtained by using the same object.

In a case of FIG. 9, there may be more non-zero components in the measurement matrix as compared to FIG. 8. In FIG. 9, a specific column indicates that information from which lens is incident through which pixel and a specific row indicates that information from which lens is incident through which pixel. The measurement matrix can be defined as a measurement matrix for a point on a flat surface where the rectilinear distances between the image sensing apparatus and the object are the same. In other words, the measurement matrix may be a measurement matrix in a flat surface perpendicular to a straight line drawn from a lens positioned at a vertex of a curved surface.

As a result, it can be understood that when there is a signal due to an image at any one point, the signal is incident through a larger number of lenses 2. By performing repeatedly such a method, a measurement matrix for a flat surface at various linear distances between the lens and the object can be obtained.

As the measurement matrix, a plurality of measurement matrices may be measured in advance and stored according to the distance from the image sensing apparatus. For example, the embodiment is described that measurement matrices, which are positioned at 10 mm, 20 mm, 30 mm, 40 mm, and 50 mm away from the image sensing apparatus (here, image sensing apparatus can more accurately denote each simple eye, which is combination of lens and photo sensor) can be stored in advance.

Figure 10:
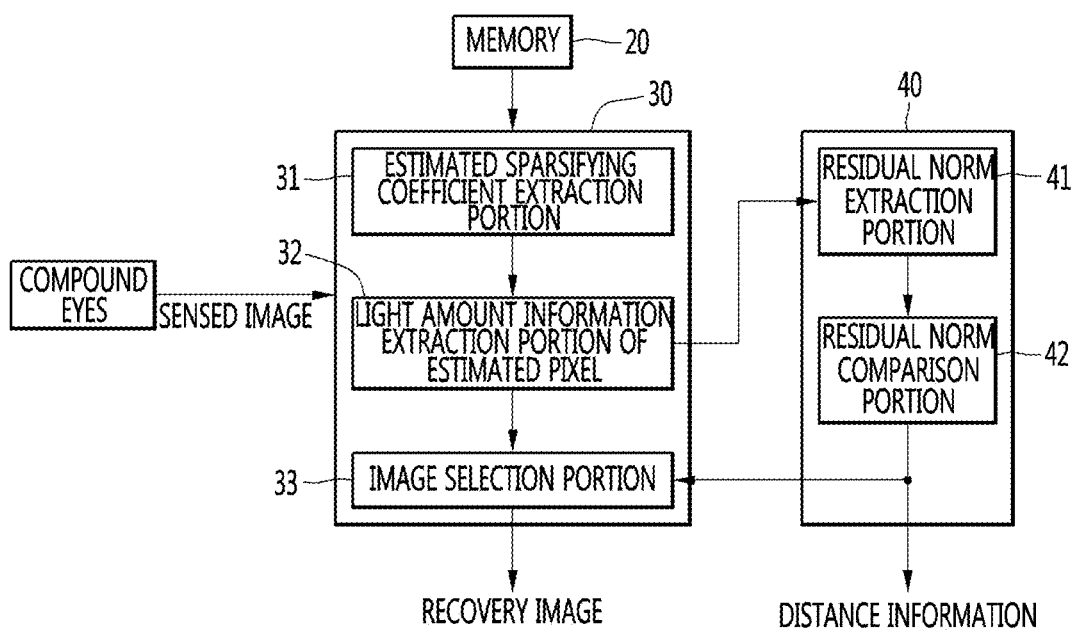
FIG. 10 is a block diagram illustrating a detailed configuration of the image sensing apparatus according to the embodiment.

FIG. 10 is a block diagram illustrating a detailed configuration of the image sensing apparatus according to the embodiment. A distance measuring apparatus will be also described together with the image sensing apparatus.

With reference to FIG. 10, the image sensing apparatus includes compound eyes 10, a memory 20 in which a plurality of pieces of information are stored, an image recovery portion 30 which recovers image using information obtained from the compound eyes 10 and information from the memory 20, and a distance measurement portion 40 which measures the distance to the object using the information obtained by the image recovery portion 30.

The compound eyes 10 are a set of a plurality of simple eye structures provided as a combination of a lens and a photo sensor. At this time, in the simple eye, preferably the acceptance angle of the lens is greater than the angle between the lenses.

Various measurement matrices (for example, measurement matrices corresponding to 10 mm, 20 mm, 30 mm, 40 mm, and 50 mm from image sensing apparatus may be stored in advance but it is not limited thereto) according to distances from the image sensing apparatus and the object and a sparsifying basis may be stored in advance in the memory.

The sensed image 4 is recognized through the compound eyes 10 and the sensed image 4 can be recovered through the image recovery portion 30. Here, the sensed image 4 can be understood as an image which is not a level that can be actually recognized but simply combines information of light recognized by each simple eye.

The image recovery portion 30 uses a measurement matrix when an image is recovered. Here, the compound eyes 10 may refer to a configuration including a plurality of simple eyes formed by the lens 2, the curved surface 1, and the photo sensor 3 illustrated in FIG. 2 being combined with each other.

In other words, since space which faces by the lens 2 faces directions which are different from each other in three dimensions, the viewing region sensed actually in two dimensions may vary depending on the distance between the object and the lens 2. In other words, the shape and size of the viewing region may be varied depending on the distance between the object and the lens 2. In view of this, a more accurate measurement matrix can be stored in advance according to distance therebetween.

For example, the measurement matrix can be provided by placing various objects at a predetermined distance in front of the lens 2 and actually specifying an object. For example, when a blank is placed at any small point, a point is spotted at a specific spot on the blank and the point is observed through the compound eyes of the embodiment, an object can be placed in a viewing region that is visible to the plurality of lenses 2. Any one complete measurement matrix can be obtained in a state of placing the point at various positions. This means that a point at any specified spot can be detected as a complex light amount through a plurality of lenses 2 to provide more information and more information can be interpreted using a compression sensing method to recover a clearer image. The compression sensing is a kind of digital signal processing technique and an image can be recovered through another digital signal processing technique. However, in the case of the embodiment, more accurate and clearer image recovery can be performed by using the compression sensing technique. The same applies to the following.

On the other hand, in the embodiment, the acceptance angle of the lens 2 is considerably greater than the angle between the lenses 2. Accordingly, a considerable amount of the sensed image 4 sensed through each photo sensor 3 is overlapped for each pixel. Therefore, a point placed at a specific spot can be detected by the plurality of lenses 2 and the photo sensors 3 in an overlapped manner.

The sensed image recognized by the compound eyes 10 may be recovered by the image recovery portion 10 to extract a recovery image. The configuration of the image recovery portion 30 will be described in more detail.

The image recovery portion 30 can recover an image by using the detection image 4 that implements the amount of light which is incident through each simple eye forming the compound eyes 10, the measurement matrix stored in the measurement matrix storage portion 20, and the sparsifying basis.

The sensed image 4 may be provided with pixels corresponding to the number of lens 2 and can retrieve all the measurement matrices corresponding to the distances from the compound eyes 10 to the object stored in the memory 20.

When the light amount information of the pixel in the sensed image 4 (which may correspond to viewing region of lens 2) is referred to as y, the measurement matrix is referred to as A, and the light amount information of the pixel in the recovered image 5 is referred to as x, a relationship of mathematical expression 1 to be described below is established.

$$y = Ax$$
$$= A\Psi s$$

[mathematical expression 1]

Where, Y can be provided as a matrix of M×1, A can be provided as a matrix of M×NL, and x can be provided as a matrix of NL×1.

Where, N can be provided as the number of pixels in the recovered image 5, M can be provided as the number of pixels in the sensed image 4, A can be provided as the measurement matrix, L can be provided at least two measurement matrices, as the number of measurement matrices, and Ψ can be provided as a sparsifying basis which is estimated so that the light amount information x of the pixel in the recovered image has a small number of nonzero elements s (here, s may be referred to as a sparsifying coefficient).

aij, which is an arbitrary element in the measurement matrix A, indicates that the light amount of the jth recovered pixel is affected by the viewing region of the ith lens. For example, when aij is zero, the pixel of the jth recovered image may be considered to be positioned an outside of the viewing region 6 of the ith lens, when aij is one, the pixel of the jth recovered image may be considered to be positioned in the viewing region 6 of the ith lens, and when aij is from zero to one, the pixel of the jth recovered image may be considered to be at the boundary of the viewing region 6 of the ith lens.

In the other hand, the mathematical expression 1 is an underdetermined system given by N>M. In order to obtain the solution of the underdetermined system through the optimization process, first, the solution can be expressed as a sparse signal and second, the measurement matrices need to be provided as to be incoherent to each other. It is known that images in the natural world are represented as sparse signals in domains, such as a wavelet domain discrete cosine transform, and discrete Fourier transform. Therefore, the first condition is satisfied. Second, since the viewing region of any lens in the measurement matrix applies information only to a specific pixel of the recovered image, it may be incoherent with respect to all pixels. Therefore, the second condition described above is satisfied.

Accordingly, in the embodiment, the compressed sensing using a sparse representation may be used to obtain the solution of mathematical expression 1.

X in mathematical expression 1 can be solved by the linear equation of mathematical expression 2.

$$\hat{s} = \operatorname*{argmin}_{s} \|s\|_1 \text{ subject to } \|y - A\Psi s\|_2^2 \leq \varepsilon \qquad \text{[mathematical expression 2]}$$

1 denotes an L1 norm, ε is a threshold that can be set, modified or selected in advance, and $\hat{S}$ is an estimated sparsifying coefficient.

In the embodiment, mathematical expression 2 is solved by an alternating direction method. The alternative direction method can be referred in Yang, J. & Zhang, Y. Alternating directional algorithms for 11-problems in compressive sensing. SIAM J. Sci. Comput. 33, 250-278 (2011). In addition, mathematical expression 1 can also obtain an optimal solution by using simplex methods, steepest descent methods, or second derivative methods. As another example, the optimal solution of equation 1 can be obtained by using an L1 norm optimization method proposed by the applicant of the present invention in Korean Patent Registration No. 10-1423964.

The estimated sparsifying coefficient may be extracted by the estimated sparsifying coefficient extraction portion 31. The estimated sparsifying coefficient may be provided as a N×1 matrix and may be finally given as a matrix of NL×1 since the estimated sparsifying coefficient can be provided for each measurement matrix. Here, the fact that the estimated sparsifying coefficient is provided for each measurement matrix means that the measurement matrix corresponding to the distances does not solve the mathematical expression 2 separately, but the measurement matrix, i.e. A, is solved at once as a whole. Although solving of mathematical expression 2 for each measurement matrix is not excluded, the reason is that since the sparsifying operation is more accurate, when the measurement matrix A is solved a single set of aggregated measurement matrices at once as a whole, a more accurate solution of mathematical expression 2 can be obtained. Hereinafter, the same applies to the following.

When the small number of nonzero elements are obtained by the L1 norm optimization method, the light amount information x of the pixel in the recovered image can be estimated using the following mathematical expression 3.

$$\hat{X} = \Psi \hat{S} \qquad \text{[mathematical expression 3]}$$

Where, $\hat{X}$ can be considered as the light amount information x of the pixel in the recovered image, that is, the light amount information of the estimated pixel. The light amount information of the estimated pixel can be extracted by the light amount information extraction portion 32 of the estimated pixel.

The estimation sparsifying coefficient and the light amount information of the estimated pixel may be transmitted to a distance measurement portion 40. The distance measurement portion 40 can measure the distance to the object by referring to the estimated sparsifying coefficient and the light amount information of the estimated pixel. The distance measurement portion 40 includes a residual norm extraction portion 41 which extracts a residual norm for each used measurement matrix and a residual norm comparison portion 42 which compares the residual norm extracted by the residual norm extraction portion 41 and measuring the distance between the image sensing apparatus and the object.

In more detail, the residual norm extraction portion 41 extracts a residual norm by using mathematical expression 4 using the light amount information of the estimated pixel and the sensed image obtained for each applied measurement matrix.

$$r_i(y) := \|y - \Psi \delta_i(X)\|_2 \qquad \text{[mathematical expression 4]}$$

Where ri is the residual norm of the ith measurement matrix, y is the sensed image, Ψ is the sparsifying basis, δi is a characteristic function that leaves only the estimated sparsifying coefficient of the ith measurement matrix and makes the estimated sparsifying coefficient of the other measurement matrix to be zero. Ψδi may be referred to as a recovery signal as a recovery image. The residual norm can be provided as an L2 norm.

Therefore, according to mathematical expression 4, the value of the residual norm can be obtained for each measurement matrix. The greater the residual norm, the more likely it is that the light amount information of the estimated pixel is incorrect.

Thereafter, in the residual norm comparison portion 42, the residual norms are compared for each measurement matrices and thus the measurement matrix having the smallest residual norm can be selected. Here, the distance at which the selected measurement matrix is obtained can be determined as a distance between the image sensing apparatus and the object. The distance at which the selected measurement matrix is obtained can be at least determined as the closest distance to the distance to the actual object. Further, the distance from the image sensing apparatus to the object, which is measured using the selected measurement matrix, can be determined as the distance to the object.

By using the operation, the residual norm comparison portion 42 can extract the distance information. In addition, the residual norm comparison portion 42 may output the distance information to the image selection portion 33. The image selection portion 33 can select the recovered image using the measurement matrix of the corresponding distance and output the recovery image.

At this time, the image selection portion 33 may retrieve the measurement matrix corresponding to the measured distance from the memory 20 to newly recover an image. This case can be preferably used in a case where various objects in various distances affect the sensed image.

Alternatively, the image selection portion 33 can select the light amount information corresponding to the measurement matrix corresponding to the measured distance among the light amount information of the estimated pixel estimated by the light amount information extraction portion 32 and thus recover the image. This case can be preferably used in a case where a single object or a limited number of objects affect the sensed image.

According to the apparatus described above, an optimal recovery image can be obtained without specifying the measurement matrix, that is, without specifying the distance.

Since the image sensing apparatus of FIG. 10 extracts the distance information, the image sensing apparatus can be used as a distance information measuring apparatus itself. In addition, in a case where the image sensing apparatus of FIG. 10 does not extract the distance information but uses the distance information only as internal information of the image sensing apparatus, the image sensing apparatus may be a distance information measuring apparatus.

Similarly, in a case where the image selection portion 33 is not provided, it may be also used only as the distance information measuring apparatus which obtains only the distance information without performing the function as the image sensing apparatus. In this case, only the estimated sparsifying coefficient extraction portion 31, the residual norm extraction portion 41, and the residual norm comparison portion 42 may be used to measure the distance information.

Figure 11:
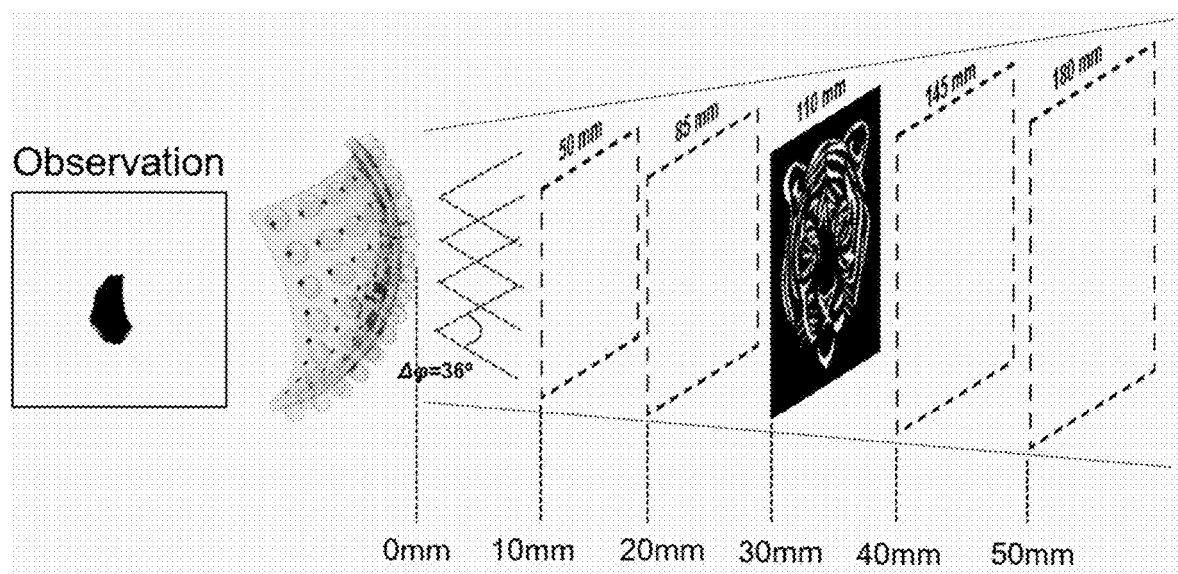
FIG. 11 to FIG. 13 are diagrams illustrating appearances and results of simulation for one object.
Figure 12:
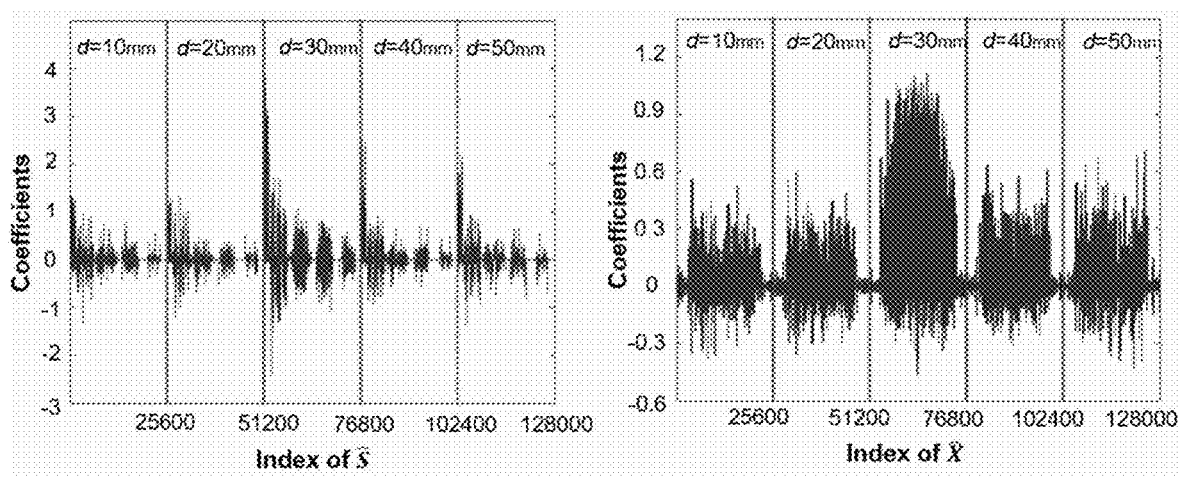
Figure 13:
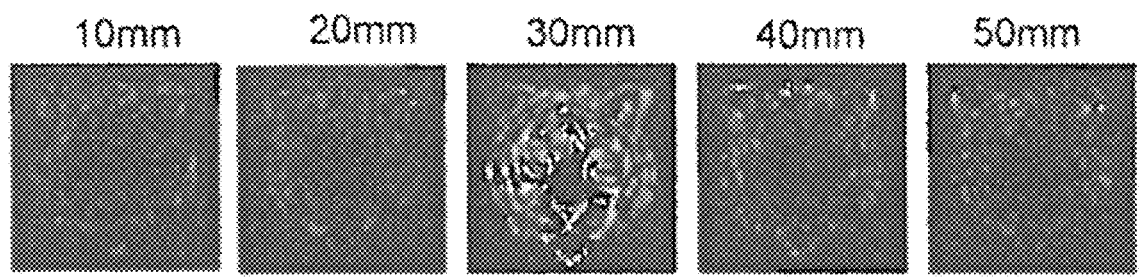

FIG. 11 to FIG. 13 are diagrams illustrating the appearances and the results of the simulation.

FIG. 11 illustrates that an image of a tiger is placed at 30 mm in front of the image sensing apparatus, and an observation image is obtained by the image sensing apparatus.

The left graph of FIG. 12 illustrates the estimated sparsifying coefficient and the light graph thereof illustrates the light amount information of the estimated pixel. As the number of the estimated sparsifying coefficients, 25,600 estimated sparsifying coefficients are used for each measurement matrix.

It can be seen that the estimated sparsifying coefficient has the largest coefficient value in the case of a 30 mm measurement matrix. The fact that the estimated sparsifying coefficient is large may mean that the object is likely to be placed at the distance of the measurement matrix from which the corresponding estimated sparsifying coefficient is extracted.

The light amount information of the estimated pixel also has the largest value in a case of 30 mm.

FIG. 13 is a diagram illustrating an image configured by using the light amount information of the estimated pixel, and it can be confirmed that an accurate image is formed in the case of 30 mm.

Therefore, it can be confirmed that the object is placed at a distance of 30 mm.

Figure 14:
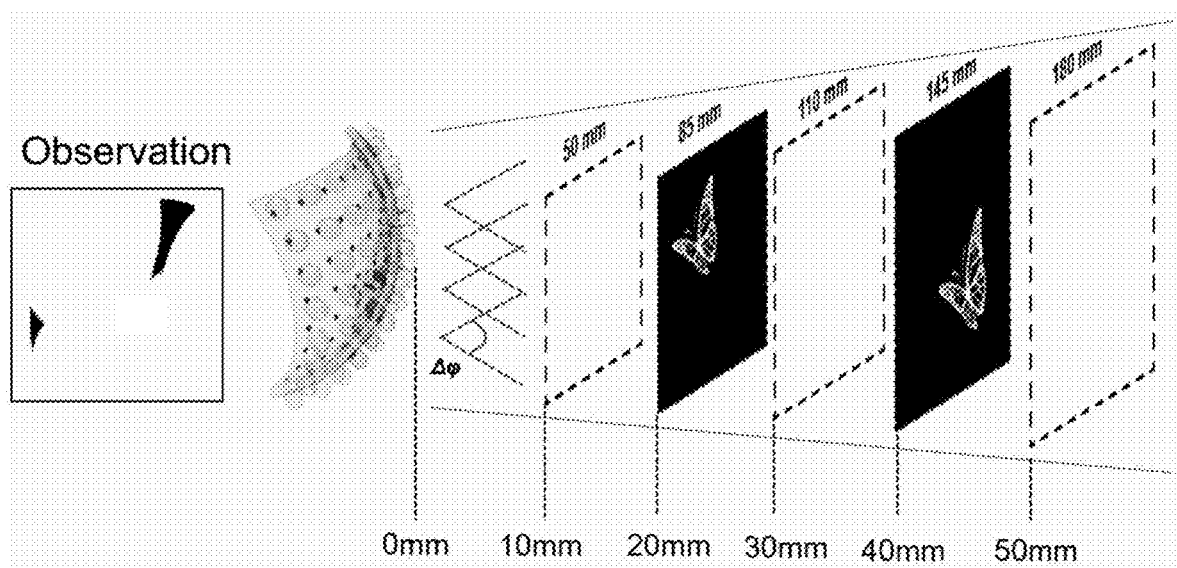
FIG. 14 to FIG. 16 are diagrams illustrating appearances and results of simulation in a case where objects are placed at two positions which have different distances from each other.
Figure 15:
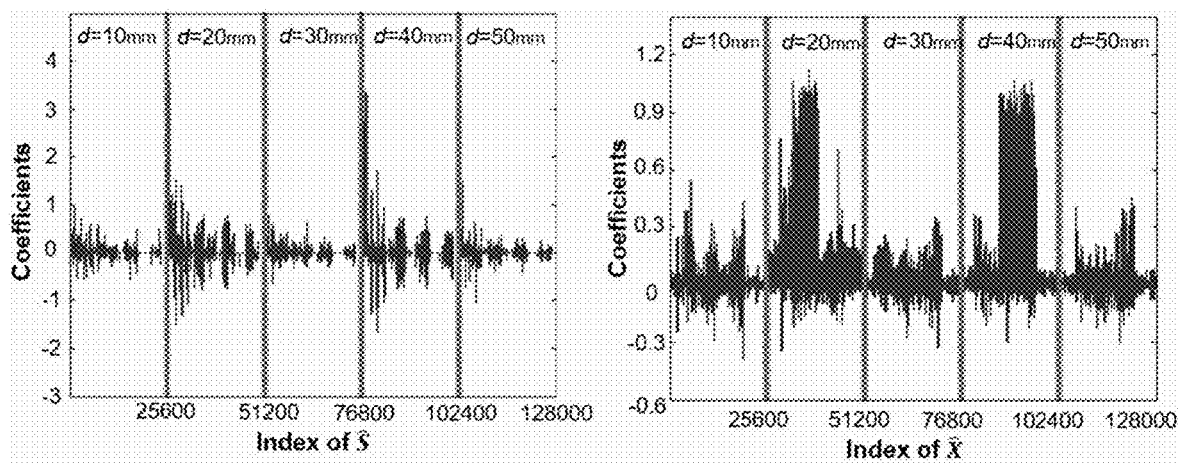
Figure 16:
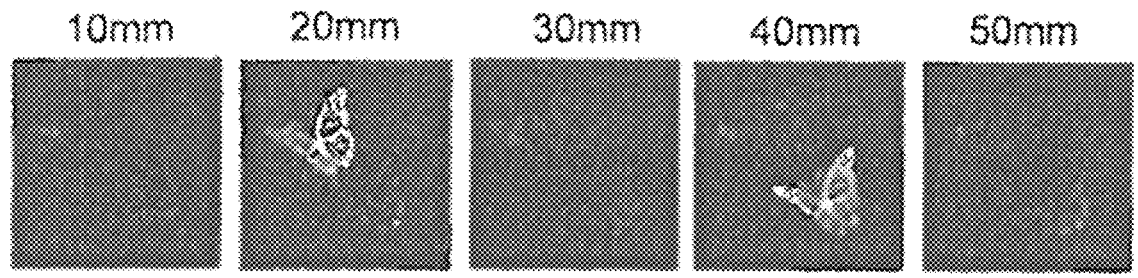

FIG. 14 to FIG. 16 are diagrams illustrating appearances and results of simulation in a case where images are placed at two different distances, respectively.

As illustrated in FIG. 11 to FIG. 13, a position where the estimated sparsifying coefficient is large or the light amount information of the estimated pixel is large is a distance where the object is placed and FIG. 11 to FIG. 13 illustrates that the result of recovering the image using the measurement matrix of the corresponding distance provides an accurate image.

According to the result described above, it can be seen that the image sensing apparatus and the distance measuring apparatus of the embodiment can measure the distances relating at least two objects together. Similarly, it can be seen that images of at least two objects can be recovered together. This operation is due to the fact that an object may be placed in the corresponding measurement matrix when being operated using a plurality of measurement matrices, and when the estimated sparsifying coefficient from at least one (which is not specified by only one) of the measurement matrices is large or the light amount information of the estimated pixel is large.

Figure 17:
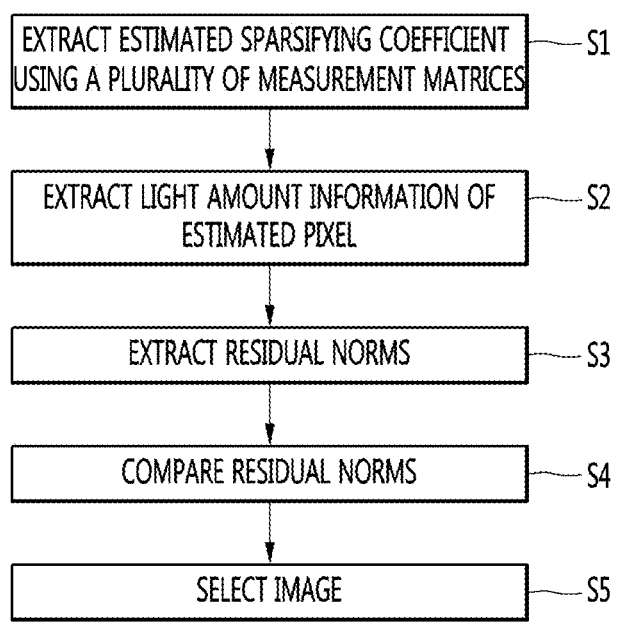
FIG. 17 is a flowchart explaining an image sensing method and a distance measuring method according to the embodiment.

FIG. 17 is a flowchart explaining an image sensing method according to the embodiment. A distance measurement method can also be described together by the flowchart. In understanding the present method, reference will be made to the configuration of the image sensing apparatus and overlapping descriptions refer to the description of the apparatus.

First, an estimated sparsifying coefficient from the sensed image is obtained S1 by at least using at least two measurement matrices according to the distance from the image capture device, and the light amount information of the estimated pixel is extracted S2 by using the estimated sparsifying coefficient. Here, the light amount information of the estimated pixel can be obtained for each measurement matrix.

A residual norm is extracted for each measurement matrix S3 by using the light amount information of the estimated pixel, a measurement matrix for providing the smallest residue norm is obtained S4 by comparing the residual norms, and a discovered image by using the corresponding measurement matrix can be selected.

On the other hand, here, the measurement matrix selected at the residue norm comparison step S4 can determine the obtained distance as the distance to the object.

Of course, the description applied to the apparatus which can be performed together for a plurality of objects is equally applicable to the image sensing and distance measurement in the above method.

Another embodiment of the present invention is introduced.

First Alternative Embodiment

The original embodiment described above is described that the residual norms are compared to obtain the distance to the object and the image can be recovered. However, a case where the value of the residual norm is small can be generated. In this case, it is possible to find by comparing residual norms, but a case where the comparison between residual norms is difficult can be generated.

The first alternative embodiment is characterized in that it can also cope with the case described above. Therefore, only the characteristic portions of the present embodiment will be described, and the description of the original embodiments will be intactly applied to the description of the other portion except for the characteristic portions of the present embodiments.

Figure 18:
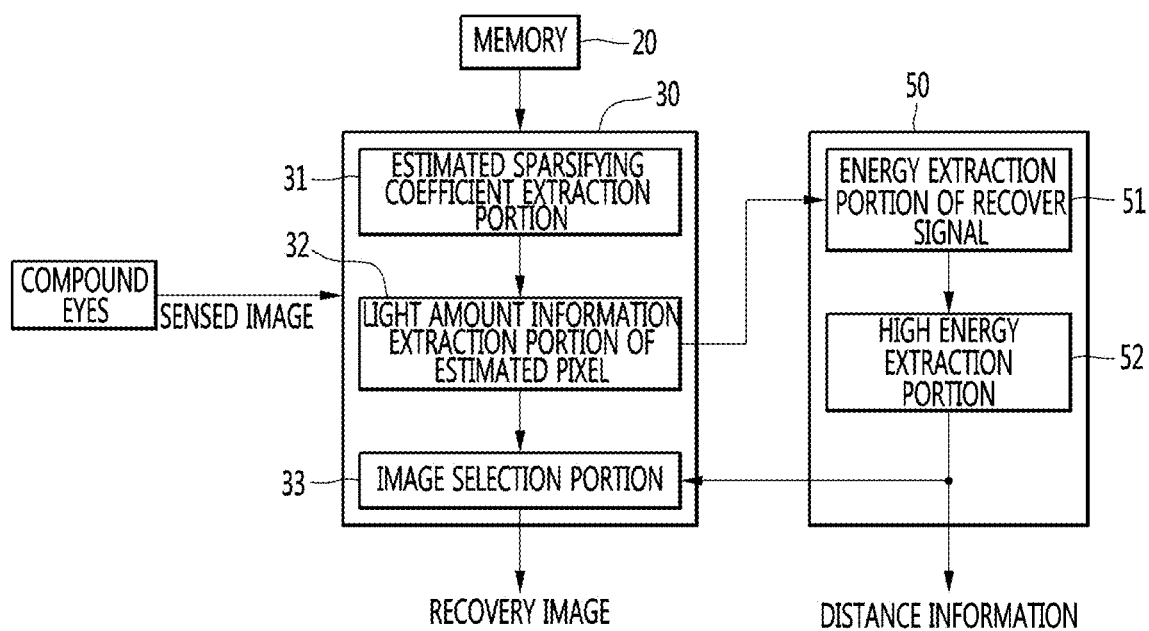
FIG. 18 is a block diagram of an image sensing apparatus according to a first alternative embodiment.

FIG. 18 is a block diagram of an image sensing apparatus according to the first alternative embodiment.

With reference to FIG. 18, in the present embodiment, the distance measurement portion 50 may be provided with an energy extraction portion 51 of a recovery signal instead of the residual norm extraction portion 41 and may be provided with a high energy extraction portion 52 instead of the residual norm comparison portion 42.

Here, the energy extraction portion 51 of a recovery signal obtains the energy of the recovery signal. The energy of the recovery signal may be defined by mathematical expression 5.

$$E_i(y) := \hat{x}_i^T \hat{x}_i \quad \text{[mathematical expression 5]}$$

Where, Ei is an image of the recovery signal recovered using the ith measurement matrix, $\hat{X}_i$ may be the light amount information of the pixel in the recovery image by using the ith measurement matrix, and T means the transposed matrix. The energy of the recovery signal is the same as that of adding the square of the value of the light amount information of the pixel in the image. Therefore, the energy of the recovery signal may be the L2 norm of the recovery signal.

On the other hand, the reason that the energy of the recovery signal increases at a distance where the object is actually placed is that the signal is recovered in a sparsifying manner when the signal is recovered particularly at a position where the object is placed in a sparsifying manner by applying mathematical expression 2. The recovered signal x in FIG. 12 and FIG. 15 illustrate the increase of the energy of the recovery signal at a distance where the object is actually placed.

The high energy extraction portion 52 extracts a measurement matrix having a relatively high energy of the recovery signal (at this time, value obtained by normalizing energy of recovery signal for each measurement matrix can be used) and the measurement matrix can be determined as the distance where the object is placed. Of course, the distance of the measurement matrix can be transmitted as distance information.

Figure 19:
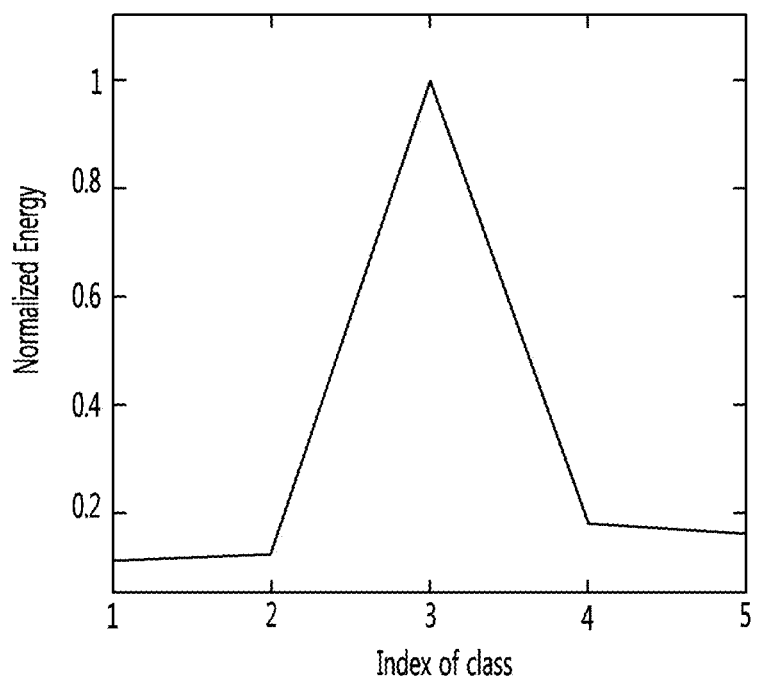
FIG. 19 and FIG. 20 are diagrams illustrating extraction of the measurement matrix by the high energy extraction portion using normalized values in cases of FIG. 12 and FIG. 15, respectively.
Figure 20:
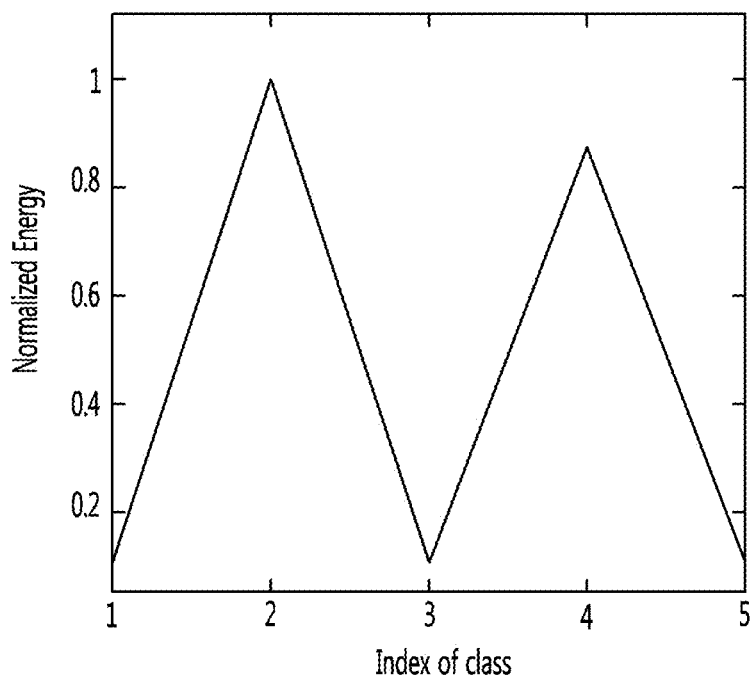

FIG. 19 and FIG. 20 are diagrams illustrating extraction by the high energy extraction portion using the normalized values in a case of FIG. 12 and FIG. 15, respectively. With Reference to FIG. 19 and FIG. 20, in a case where the energy of the extracted recovery signal is approximately 0.5 or more, it can be determined that there is an object.

The present embodiment is advantageous in that it is easier to make a determination because the implementation thereof is performed by comparing predetermined thresholds without performing a process of comparing residual nodes, unlike the original embodiment.

The present embodiment uses the light amount information of the pixels in the image recovered by using the energy of the recovery signal, that is, the ith measurement matrix, unlike the use of the residual norm in the original embodiment.

The residual norm is a value that uses the difference between the recovery signal (which is different for each measurement matrix) and the detection signal (which is the same for each measurement matrix). On the other hand, the energy of the recovery signal is a value using the value of the recovery signal itself. Therefore, the distance to an object can be obtained by necessarily using a recovery signal that varies for each measurement matrix while using a norm that can use any value that is not varied for each measurement matrix can be used. Here, the norm may be the L2 norm but is not limited thereto. Of course, only the recovery signal which varies for each measurement matrix as in the present embodiment can be also used. In other words, the distance to an object can be determined by a single value by measuring the norm.

In addition, the image sensing method and the distance measuring method can be also similarly obtained by the present embodiment. More specifically, the distance can be measured by using the energy of the recovery signal without using the residual norm and the image can be sensed using the measured distance.

Second Alternative Embodiment

In the original embodiment described above, the lens is disposed on the curved surface, but the present invention is not limited thereto. For example, even if the lens is disposed on a flat surface, there is no problem in the implementation of the present invention. However, it is needless to say that it is preferable to be provided as a curved surface in order to obtain an image having a wide range, for example, a range exceeding 180 degrees.

According to the present invention, in realizing an image sensing apparatus using compound eyes, even if an object is placed anywhere, the image of the object can be recovered without knowing the distance to the object in advance, and the distance information to the object can be obtained.

What is claimed is:

1. An image sensing apparatus comprising:
    compound eyes which can obtain a sensed image of an object by a plurality of simple eyes;
    a memory in which at least two measurement matrices in which obtained distances are different from each other are stored; and
    a processor configured to
    recover an image from the sensed image by using a digital signal processing technique which uses a sparse representation for each measurement matrix, using the at least two measurement matrices; and
    measure a distance of the object by using a norm of a value using at least light amount information of an estimated pixel which is estimated for each measurement matrix,
    wherein the processor recovers the image by using the measurement matrix corresponding to the measured distance,
    wherein the compound eyes include the plurality of simple eyes,
    wherein each of the plurality of simple eyes includes a lens and a corresponding photo sensor, and
    wherein each of the measurement matrix indicates mapping information between pixels of the sensed image and the plurality of simple eyes according to a distance between the object and the compound eyes.

2. The image sensing apparatus according to claim 1, wherein the processor is further configured to
    extract an estimated sparsifying coefficient for each measurement matrix by using the digital signal processing technique;
    extract the light amount information of the estimated pixel from the extracted estimated sparsifying coefficient; and
    select an image recovered as the measurement matrix corresponding to the distance.

3. The image sensing apparatus according to claim 1, wherein the processor is further configured to
    extract a residual norm for each the measurement matrix; and
    measure a distance of the object by comparing at least two extracted residual norms and thus using the distance where a measurement matrix providing the smallest residual norm is obtained.

4. The image sensing apparatus according to claim 1, wherein the processor is further configured to
- extract an energy of recovered image by using light amount information of the estimated pixel; and
- measure the distance of the object using a distance where the measurement matrix providing a recovery signal having a high energy is obtained.

5. The image sensing apparatus according to claim 4, wherein the processor normalizes, compares and extracts the energy of the recovery signal.

6. The image sensing apparatus according to claim 1, wherein the digital signal processing technique using the sparse representation may be performed by any one of an alternative direction method, a simplex method, a slope descent method, a second order differentiation method, and an L1 norm optimization method.

7. The image sensing apparatus according to claim 1, wherein the processor uses a single set of measurement matrices in which the respective measurement matrices are collected at a time.

8. The image sensing apparatus according to claim 1, wherein the image recovered by the measurement matrix corresponding to the measured distance uses the light amount information of the estimated pixel.

9. A distance measuring apparatus comprising:
- compound eyes which can obtain a sensed image of an object by a plurality of simple eyes;
- a memory in which at least two measurement matrices in which obtained distances are different from each other are stored; and
- a processor configured to
- extract light amount information of an estimated pixel from the sensed image by using a digital signal processing technique which uses a sparse representation for each measurement matrix, by using the at least two measurement matrices; and
- measure a distance of the object by using a norm of a value using at least light amount information of the estimated pixel which is estimated for each measurement matrix,
- wherein the compound eyes include the plurality of simple eyes, wherein each of the plurality of simple eyes includes a lens and a corresponding photo sensor, and
- wherein each of the measurement matrix indicates mapping information between pixels of the sensed image and the plurality of simple eyes according to a distance between the object and the compound eyes.

10. The distance measuring apparatus according to claim 9, the processor is further configured to
- extract a residual norm for each the measurement matrix; and
- measure a distance of the object by comparing at least two extracted residual norms and thus using the distance where a measurement matrix providing the smallest residual norm is obtained.

11. The distance measuring apparatus according to claim 9, wherein the processor is further configured to
- extract an energy of recovered image by using light amount information of the estimated pixel; and
- measure the distance of the object using a distance where the measurement matrix providing a recovery signal having a high energy is obtained.

12. A distance measuring method comprising:
- obtaining an estimated sparsifying coefficient from a sensed image of an object obtained by compound eyes, by using at least two measurement matrices in which obtained distances are different from each other;
- extracting light amount information of an estimated pixel by using the estimated sparsifying coefficient; and
- measuring a distance of the object, by using a norm of a value using at least the light amount information of the estimated pixel which is estimated for each measurement matrix,
- wherein the compound eyes include the plurality of simple eyes,
- wherein each of the plurality of simple eyes includes a lens and a corresponding photo sensor, and
- wherein each of the measurement matrix indicates mapping information between pixels of the sensed image and the plurality of simple eyes according to a distance between the object and the compound eyes.

13. An image sensing method comprising:
- recovering an image of an object from the sensed image, by using a measurement matrix determined by the distance measuring method of claim 12.

14. The distance measuring method according to claim 12,
- wherein the measuring a distance includes
- extracting a residual norm for each the measurement matrix; and
- measuring a distance of the object by comparing the residual norms and thus using the distance where the measurement matrix providing the smallest residual norm is obtained.

15. The distance measuring method according to claim 12, wherein the measuring a distance includes
- extracting an energy of the recovery signal by using the light amount information of the estimated pixel; and
- measuring the distance of the object by using the distance where the measurement matrix providing the recovery signal having high energy is obtained.

16. The distance measuring method according to claim 12,
- wherein the distances of at least two objects of which distances are different from each other are measured together.

* * * * *